(12) United States Patent
Kim et al.

(10) Patent No.: US 11,703,243 B2
(45) Date of Patent: Jul. 18, 2023

(54) COMPONENT USED IN AIR CONDITIONER AND AIR CONDITIONER HAVING SAME (71) Applicant: Samsung Electronics Co., Ltd., Suwon-si (KR)

(72) Inventors: Jee-yong Kim, Suwon-si (KR); Jae-hyoun Kim, Hwaseong-si (KR); Jin-o Kim, Seoul (KR); Sin-young Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1540 days.

(21) Appl. No.: 15/756,950

(22) PCT Filed: Aug. 23, 2016

(86) PCT No.: PCT/KR2016/009309
§ 371 (c)(1),
(2) Date: Mar. 1, 2018

(87) PCT Pub. No.: WO2017/039210
PCT Pub. Date: Mar. 9, 2017

(65) Prior Publication Data
US 2018/0245812 A1      Aug. 30, 2018

(30) Foreign Application Priority Data

Sep. 1, 2015   (KR) .................... 10-2015-0123720

(51) Int. Cl.
*F24F 11/48*     (2018.01)
*B05D 5/08*     (2006.01)
(Continued)

(52) U.S. Cl.
CPC ............... *F24F 11/48* (2018.01); *B05D 5/00* (2013.01); *B05D 5/08* (2013.01); *B05D 5/12* (2013.01);
(Continued)

(58) Field of Classification Search
None
See application file for complete search history.

(56) References Cited

U.S. PATENT DOCUMENTS 7,354,624 B2   4/2008  Millero et al.
7,354,650 B2   4/2008  Nakajima et al.
(Continued)

FOREIGN PATENT DOCUMENTS

JP    2000-176281 A    6/2000
JP    3181093 B2       7/2001
(Continued)

OTHER PUBLICATIONS

Notice of Preliminary Rejection dated Feb. 1, 2022, in connection with Korean Application No. 10-2015-0123720, 16 pages.
(Continued)

*Primary Examiner* — Cheng Yuan Huang (57) ABSTRACT

A component used in an air conditioner includes a substrate and a nano-coating formed on a surface of the substrate, wherein the nano-coating includes a lower coating formed on the surface of the substrate; and an upper coating formed on the upper surface of the lower coating, a coating composition of the upper coating includes nanoparticles having a diameter of 10 nm to 30 nm, and an interval between adjacent nanoparticles among the plurality of nanoparticles located on a surface of the upper coating is 10 nm to 30 nm.

10 Claims, 8 Drawing Sheets

(51) Int. Cl.
*F24F 13/08* (2006.01)
*F24F 13/20* (2006.01)
*F24F 13/30* (2006.01)
*B05D 5/12* (2006.01)
*B05D 5/00* (2006.01)
*B05D 7/00* (2006.01)
*F04D 25/08* (2006.01)
*F24F 1/0063* (2019.01)
*F24F 1/0057* (2019.01)
*F24F 1/0073* (2019.01)
*F24F 110/50* (2018.01)
*B05D 1/12* (2006.01)

(52) U.S. Cl.
CPC .............. *B05D 7/00* (2013.01); *F04D 25/08* (2013.01); *F24F 1/0057* (2019.02); *F24F 1/0063* (2019.02); *F24F 1/0073* (2019.02); *F24F 13/08* (2013.01); *F24F 13/20* (2013.01); *F24F 13/30* (2013.01); *B05D 1/12* (2013.01); *C01P 2004/64* (2013.01); *F24F 2110/50* (2018.01)

(56) References Cited

U.S. PATENT DOCUMENTS

| | | | |
|---|---|---|---|
| 9,534,159 | B2 | 1/2017 | Burger |
| 9,925,560 | B2 | 3/2018 | Armstrong et al. |
| 2005/0221098 | A1* | 10/2005 | Azzopardi .......... C03C 17/3417 428/210 |
| 2005/0266235 | A1 | 12/2005 | Nakajima et al. |
| 2011/0315360 | A1 | 12/2011 | Yamamoto et al. |
| 2015/0243402 | A1* | 8/2015 | Cho .................. B01J 13/02 427/372.2 |

FOREIGN PATENT DOCUMENTS

| | | | |
|---|---|---|---|
| JP | 5202467 | B2 | 6/2013 |
| JP | 2014-205332 | A | 10/2014 |
| JP | 2016-525963 | A | 9/2016 |
| KR | 20-0328559 | Y1 | 9/2003 |
| KR | 10-2004-0103963 | A | 12/2004 |
| KR | 10-2007-0034516 | A | 3/2007 |
| KR | 10-2007-0034518 | A | 3/2007 |
| KR | 10-2010-0004280 | A | 1/2010 |
| KR | 10-2013-0119980 | A | 11/2013 |
| WO | 2010/106762 | A1 | 9/2010 |
| WO | 2014193573 | A1 | 12/2014 |

OTHER PUBLICATIONS

ISA/KR, International Search Report and Written Opinion of the International Searching Authority, International Application No. PCT/KR2016/009309, dated Dec. 21, 2016, 18 pages.

Extended European Search Report and European Search Opinion for European Patent Application No. 16842176.6 dated May 17, 2018; 8 pages.

Notice of Allowance dated Aug. 1, 2022 in connection with Korean Patent Application No. 10-2015-0123720, 6 pages.

* cited by examiner

COMPONENT USED IN AIR CONDITIONER AND AIR CONDITIONER HAVING SAME

CROSS-REFERENCE TO RELATED APPLICATIONS AND CLAIM OF PRIORITY

The present application claims the benefit under 35 U.S.C. § 365 and is a 371 National Stage of International Application No. PCT/KR2016/009309, filed Aug. 23, 2016, which claims priority to Korean Patent Application No. 10-2015-0123720 filed Sep. 1, 2015, the disclosures of which are fully incorporated herein by reference into the present disclosure as if fully set forth herein.

TECHNICAL FIELD

The present disclosure relates to an air conditioner. More particularly, the present disclosure relates to a component used in an air conditioner that is disposed where an air that is introduced into and discharged from the air conditioner passes and provided with a nano-coating having a dust adhesion prevention function to prevent dust contained in the air from adhering to the component and an air conditioner having the same.

BACKGROUND

When an air conditioner is used for a long time, dust accumulates in the air conditioner. Particularly, a large amount of dust accumulates in components of the air conditioner through which air passes.

Dust in the air is attached to the surface of the component due to static electricity when the air passes by the component of the air conditioner.

In the prior art, a method of coating a conductive fluororesin on the surface of a component of the air conditioner is used in order to prevent such dust adhesion.

Since the fluororesin used in the fluororesin coating according to the prior art has a size of about 1 to 2 µm, dust or particles having a size of 2 µm or more are prevented from adhering to components used in the air conditioner.

However, there is a problem that the fluororesin coating cannot prevent fine dust or fine particles having a size of several tens to several hundreds of nm, less than 1 µm from adhering to components used in an air conditioner.

Accordingly, there is a need to develop a component used in an air conditioner having a dust adhesion prevention function that can prevent fine dust or fine particles having a size of several tens to several hundreds of nm from adhering to a component.

SUMMARY

The present disclosure has been developed in order to overcome the above drawbacks and other problems, and relates to a component used in an air conditioner that can prevent fine dust or fine particles from adhering to a surface and an air conditioner having the same.

According to an aspect of the present disclosure, a component used in an air conditioner may include a substrate and a nano-coating formed on a surface of the substrate, the nano-coating may include a lower coating formed on the surface of the substrate; and an upper coating formed on an upper surface of the lower coating. A coating composition of the upper coating may include nanoparticles having a diameter of 10 nm to 30 nm, and an interval between adjacent nanoparticles of the plurality of nanoparticles located in a surface of the upper coating may be 10 nm to 30 nm.

The upper coating composition of the upper coating may have a surface resistance of $10^8 \Omega$ to $10^{12} \Omega$.

The upper coating composition of the upper coating may have a contact angle with respect to water of 30 degrees to 50 degrees.

The upper coating composition of the upper coating may include at least one of $TiO_2$, $SnO_2$, $WO_3$, and organic-silane.

The upper coating composition of the upper coating may not include a fluorine (F).

The upper coating composition of the upper coating may have a specific gravity of 0.9 to 1.1.

A lower coating composition of the lower coating may include at least one of Ti, Si, and C.

The lower coating composition of the lower coating may have a specific gravity of 0.9 to 1.1.

A thickness of the upper coating may be different from a thickness of the lower coating. The thickness of the upper coating may be in a range of 100 nm to 800 nm, and the thickness of the lower coating may be in a range of 20 nm to 300 nm.

The component used in the air conditioner may include at least one of a suction grille, a discharge port, a case, blades of a fan, and a heat exchanger.

According to another aspect of the present disclosure, an air conditioner may include a case including a suction grille through which air is introduced and a discharge port through which air is discharged; a fan disposed inside the case and configured to suck air into the case and discharge the air to an outside; and a heat exchanger disposed inside the case and configured to perform heat exchange with a sucked air, wherein a nano-coating may be formed on a surface of at least one of the suction grille, the discharge port, the case, the fan, and the heat exchanger, wherein the nano-coating may include a lower coating formed on the surface of at least one of the suction grille, the discharge port, the case, the fan, and the heat exchanger; and an upper coating formed on a surface of the lower coating. An upper coating composition of the upper coating may include nanoparticles having a diameter of 10 nm to 30 nm, and an interval between adjacent nanoparticles of the plurality of nanoparticles located in a surface of the upper coating may be 10 nm to 30 nm.

DETAILED DESCRIPTION

Hereinafter, embodiments of a component used in an air conditioner and an air conditioner having the same according to the present disclosure will be described in detail with reference to the accompanying drawings.

It is to be understood that the embodiments described below are provided for illustrative purpose only, and that the present disclosure may be embodied with various modifications different form exemplary embodiments described herein. However, in the following description below, detailed description of well-known functions or components will be omitted when it may be unnecessary to obscure the subject matter of the present disclosure. Further, the accompanying drawings may be not drawn to scale in order to facilitate understanding of the invention, but the dimensions of some of the components may be exaggerated.

Figure 1:
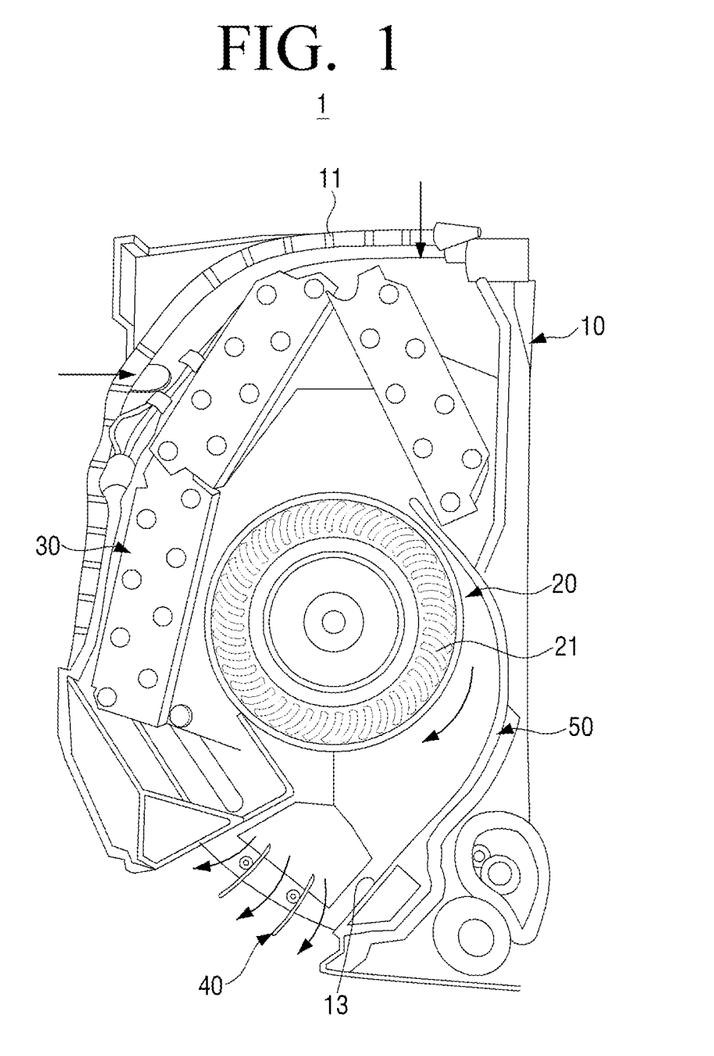
FIG. 1 is a cross-sectional view illustrating an air conditioner using components used in an air conditioner according to an embodiment of the present disclosure.

FIG. 1 is a cross-sectional view illustrating an air conditioner using components used in an air conditioner according to an embodiment of the present disclosure.

Referring to FIG. 1, an air conditioner 1 according to an embodiment of the present disclosure may include a case 10, a fan 20, a heat exchanger 30, and a plurality of horizontal blades 40.

The case 10 forms the outer shape of the air conditioner 1 and accommodates and supports the fan 20, the heat exchanger 30, and the plurality of horizontal blades 40.

The case 10 is provided with a suction grille 11 for sucking outside air into the case 10 and a discharge port 13 for discharging the sucked air to the outside.

In the case of the present embodiment, the suction grille 11 is formed on the upper surface and the front surface of the case 10. The suction grille 11 is provided with a plurality of slits through which the outside air can be sucked. Although not illustrated, a filter for filtering out dust or dirt contained in the outside air is disposed on the inner side of the suction grille 11.

The discharge port 13 is formed at the lower side of the case 10, and the discharge port 13 is provided with the plurality of horizontal blades 40. Although not illustrated in FIG. 1, a plurality of vertical blades may be disposed inside the case 10 behind the plurality of horizontal blades 40.

The fan 20 is disposed inside the case 10, sucks the outside air into the case 10, and discharges the sucked air to the outside of the case 10. The fan 20 may include a plurality of blades 21 rotated by a motor (not illustrated).

The heat exchanger 30 is formed to perform heat exchange with the sucked air, thereby lowering the temperature of the sucked air to perform cooling or thereby raising the temperature of the sucked air to perform heating. The heat exchanger 30 is connected to an outdoor device (not illustrated) to perform a refrigeration cycle. In the case of the air conditioner 1 as illustrated in FIG. 1, the heat exchanger 30 is provided between the suction grille 11 and the fan 20 inside the case 10. However, the installation position of the heat exchanger 30 is not limited thereto. As another example, although not illustrated, the heat exchanger 30 may be disposed between the fan 20 and the discharge port 13.

A discharge duct 50 for guiding the air discharging from the fan 20 to the discharge port 13 may be provided inside the case 10. One end of the discharge duct 50 forms the discharge port 13. Accordingly, the plurality of horizontal blades 40 may be provided inside the discharge duct 50.

The plurality of horizontal blades 40 are made of resin or plastic, are formed in flat plates or plates having a substantially arc shape cross-section, and are disposed in the width direction of the case 10 (direction perpendicular to the drawing in FIG. 1). The plurality of horizontal blades 40 may change the direction of the air flow, that is, the direction of wind, discharged to the outside of the case 10 by the fan 20 in the vertical direction.

The plurality of vertical blades (not illustrated) are made of resin or plastic, and may be formed in various types of flat plates. The plurality of vertical blades may be disposed at regular intervals in the width direction of the case 10.

The indoor device of the air conditioner 1 as illustrated in FIG. 1 is of a wall-mounted type; however, the present disclosure is not limited thereto.

In order to prevent dust from adhering to the components used in the air conditioner 1, that is, the case 10, the fan 20, the heat exchanger 30, the plurality of horizontal blades 40, and the discharge port 13, a nano-coating described later may be formed thereon. Particularly, a nano-coating according to an embodiment of the present disclosure may be formed on the suction grille 11, the plurality of horizontal blades 40, and the discharge port 13 of the case 10 which are in contact with the air as a passage of the air. In detail, the nano-coating may be formed on the entire surface of the suction grille 11. The nano-coating may be formed on the entire surface of the plurality of horizontal blades 40. In the case of the discharge port 13, the nano-coating may be formed on the surface in contact with the air.

When the nano-coating is applied to the components used in the air conditioner as described above, adhesion of fine dust can be prevented, and maintenance may be easy.

Hereinafter, the nano-coating applied to components used in the air conditioner according to the present disclosure will be described in detail with reference to FIGS. 2 to 5.

Figure 2A:
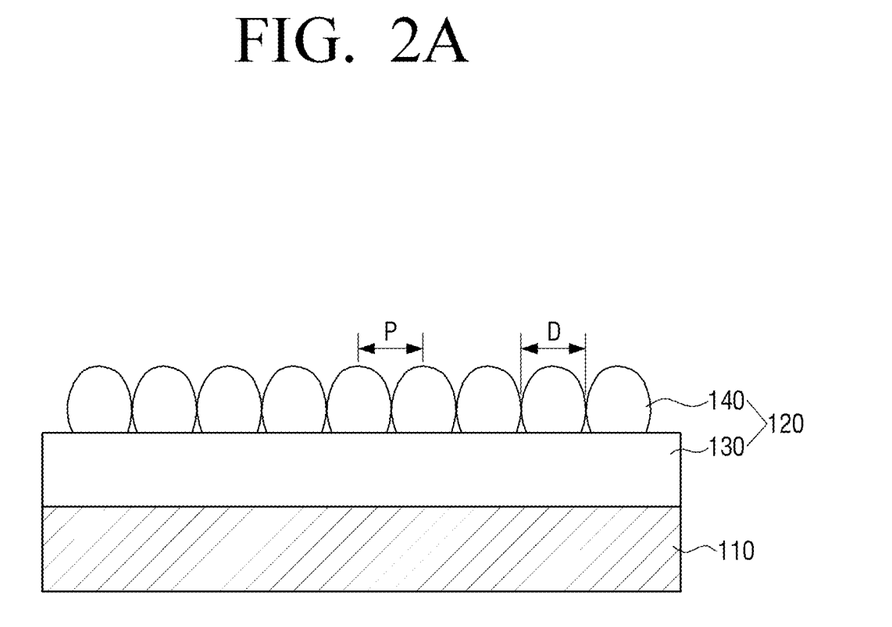
FIGS. 2a and 2b are partial cross-sectional views conceptually illustrating a coating structure of a component used in an air conditioner according to an embodiment of the present disclosure.
Figure 2B:
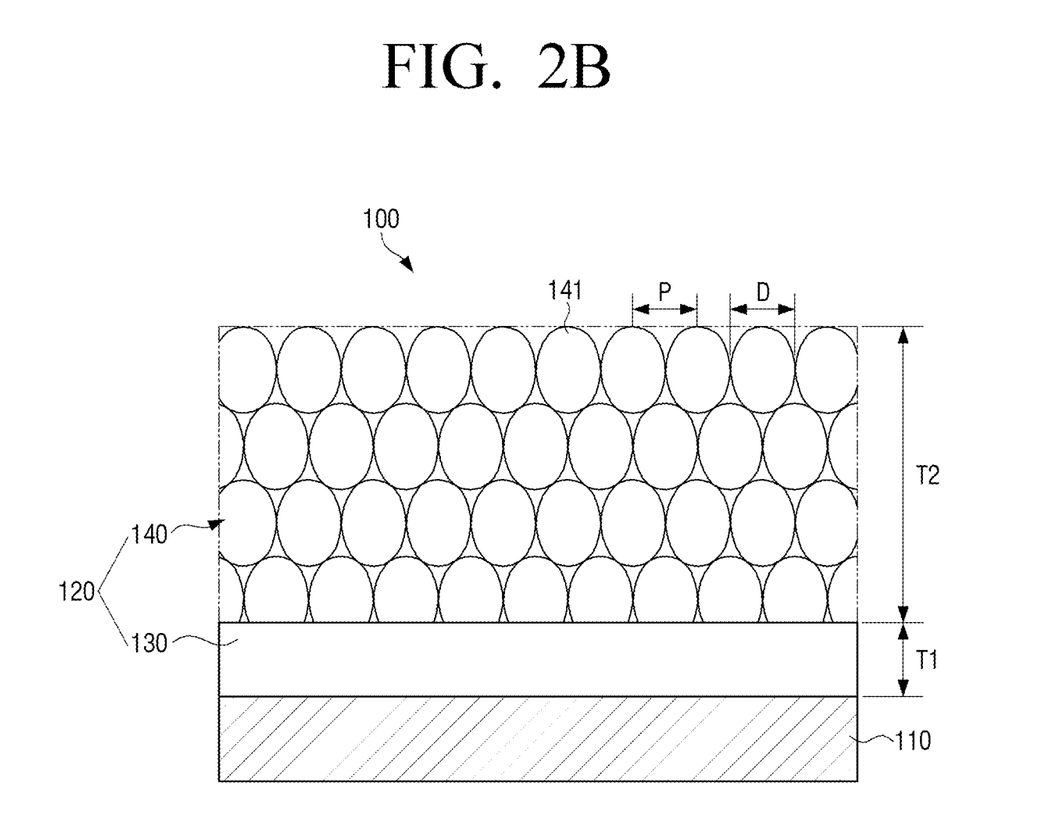
Figure 3:
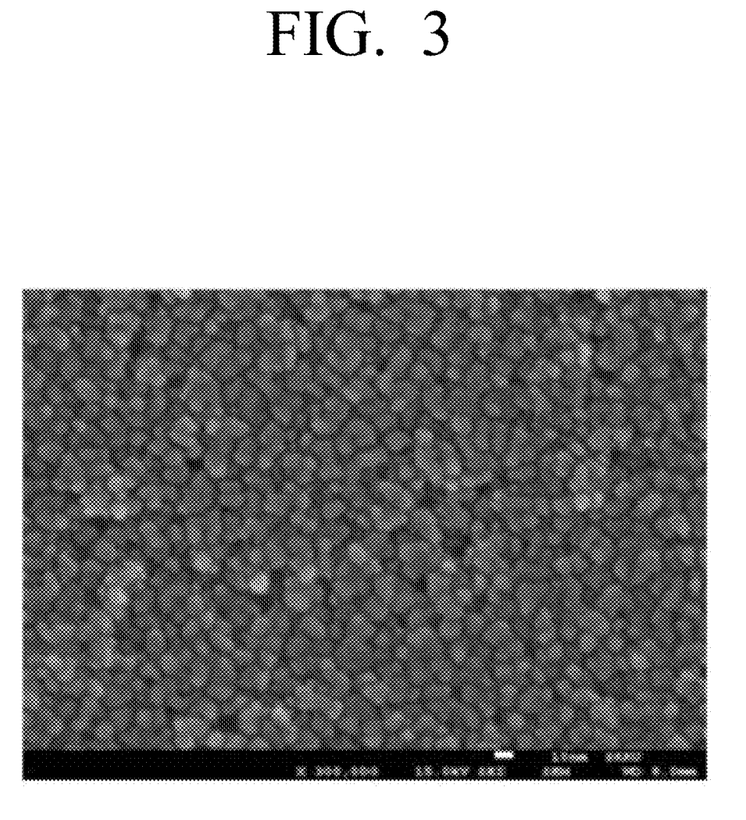
FIG. 3 is a scanning electron microscope (SEM) image of an upper coating of a component used in an air conditioner according to an embodiment of the present disclosure.
Figure 4:
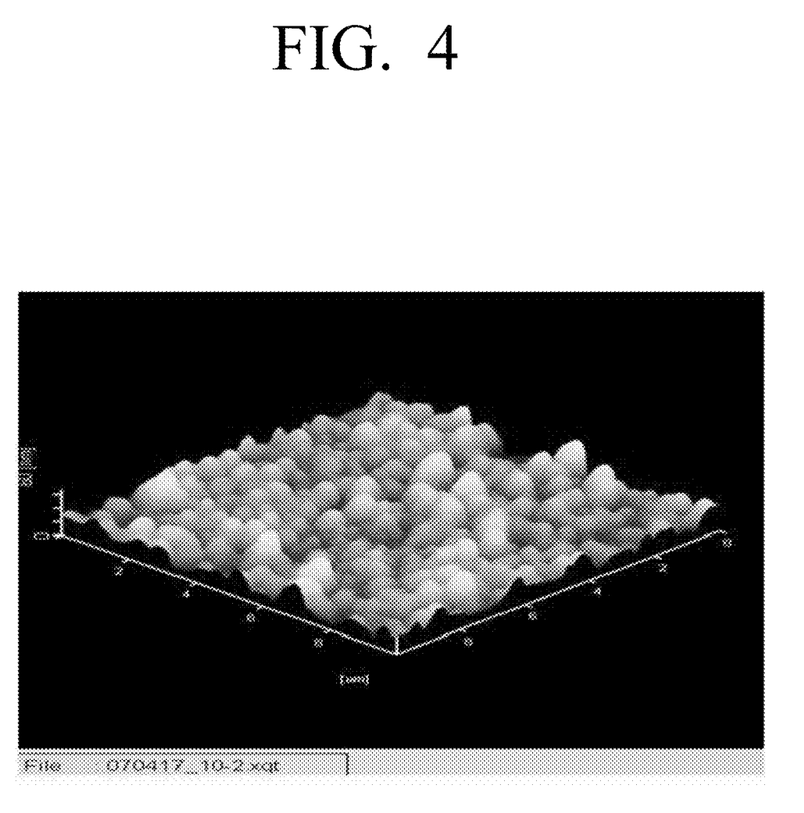
FIG. 4 is an atomic force microscope (AFM) image of an upper coating of a component used in an air conditioner according to an embodiment of the present disclosure.
Figure 5:
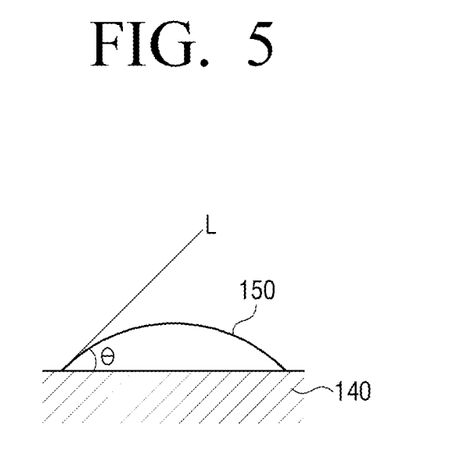
FIG. 5 is a view illustrating a contact angle of a water droplet adhered to a nano-coating surface of a component used in an air conditioner according to an embodiment of the present disclosure.

FIGS. 2a and 2b are partial cross-sectional views conceptually illustrating a coating structure of a component used in an air conditioner according to an embodiment of the present disclosure. FIG. 3 is a scanning electron microscope (SEM) image of an upper coating of a component used in an air conditioner according to an embodiment of the present disclosure, FIG. 4 is an atomic force microscope (AFM) image of an upper coating of a component used in an air conditioner according to an embodiment of the present disclosure. FIG. 5 is a view illustrating a contact angle of a water droplet adhered to a nano-coating surface of a component used in an air conditioner according to an embodiment of the present disclosure.

Referring to FIGS. 2a and 2b, a component 100 used in an air conditioner according to an embodiment of the present disclosure may include a substrate 110 and a nano-coating 120 formed on the surface of the substrate 110.

The substrate 110 forms the component 100 used in the air conditioner 1, and may be resin, plastic, or metal. For example, the substrate 110 may be the case 10, the suction grille 11, the fan 20, the heat exchanger 30, etc. constituting the air conditioner 1 as described above.

The nano-coating 120 is formed on the surface of the substrate 110 and includes two layers 130 and 140. In other words, the nano-coating 120 includes a lower coating 130 formed on the surface of the substrate 110 and an upper coating 140 formed on the upper surface of the lower coating 130. At this time, the thickness T1 of the lower coating 130 and the thickness T2 of the upper coating 140 may be different.

The lower coating 130 is configured to improve the bondability between the upper coating 140 and the substrate 110. The thickness T1 of the lower coating 130 may be about 20 nm to 300 nm.

The lower coating composition forming the lower coating 130 may include at least one of Ti, Si, and C. Silane may be used as a binder for the lower coating composition. Further, the lower coating composition may have a specific gravity of about 0.9 to 1.1 to form a lower coating by spraying using a spray gun. To this end, the lower coating composition may include an alcohol.

The upper coating 140 functions to prevent dust or dirt from adhering to the substrate 110 by removing the static electricity of the dust or dirt that is in contact with the upper coating 140.

The thickness T2 of the upper coating 140 may be about 100 nm to 800 nm. When the thickness T2 of the upper coating 140 is in this range, the dust adhesion prevention function of the upper coating 140 may be improved and the transparency of the upper coating 140 may be improved. Particularly, when the total thickness (T1+T2) of the upper coating 140 and the lower coating 130 is less than 1 μm, the transparency is improved and the color of the substrate 110 may be exposed as it is. At this time, the thickness T2 of the upper coating 140 is different from the thickness T1 of the lower coating 130.

When a fluororesin of the prior art is applied to the surface of a component used in an air conditioner to provide the dust adhesion prevention function to the component, since the thickness of the fluororesin layer is about 1 to 5 μm, the transparency is low so that the color of the substrate is not exposed as it is. However, in the case of the nano-coating 120 according to the present disclosure, the color of the substrate 110 may be exposed as it is.

The upper coating composition forming the upper coating 140 may include nanoparticles having a diameter of about 10 nm to 30 nm. The nanoparticles constituting the upper coating composition may include at least one of or all of, for example, a titanium oxide ($TiO_2$) powder, a tin oxide ($SnO_2$) powder, a tungsten oxide ($WO_3$) powder, and an organic sillane powder. However, the upper coating composition does not include a fluorine (F) component.

The upper coating 140 may be formed by spraying the upper coating composition using a spray gun in the same manner as the lower coating 130. Accordingly, a specific gravity of the upper coating composition may be about 0.9 to 1.1. To this end, the upper coating composition may include an alcohol.

In addition, the upper coating composition may be formed such that the surface resistance of the upper coating 140 is about $10^8 \Omega$ to $10^{12} \Omega$. When the surface resistance of the upper coating 140 satisfies the above condition, the electrical conductivity is increased. Therefore, when dust or dirt comes into contact with the upper coating 140, the upper coating 140 effectively absorbs static electricity of dust or dirt so that the dust or dirt does not adhere to the upper coating 140 but falls off.

The structure in which the nanoparticles forming the upper coating are combined is illustrated in FIGS. 3 and 4. The nanoparticles that make up the upper coating are bound by molecular bonding. For example, when the upper coating composition includes titanium oxide ($TiO_2$) powder and titanium Ti, the nanoparticles are bound to each other by intermolecular bonding by means of titanium Ti in an amorphous state. In addition, when the upper coating composition includes silane, the nanoparticles may be bound to each other by the silane.

At this time, the nanoparticles forming the upper coating 140 may be stacked in at least one layer. FIG. 2a schematically illustrates a case where the upper coating 140 is formed of one layer of nanoparticles 141. FIG. 2b illustrates a case where the nanoparticles forming the upper coating 140 are formed as a plurality of layers, in the present embodiment, four nanoparticles layers.

When the upper coating 140 is formed of two or more layers of nanoparticles, for example, when the upper coating 140 is formed of four layers of nanoparticles as illustrated in FIG. FIG. 2a, the surface of the upper coating 140 means the top layer. The upper coating 140 is formed so that the interval P between the adjacent nanoparticles 141 located in the surface of the upper coating 140 is about 10 nm to 30 nm.

The interval between adjacent nanoparticles 141 among the plurality of nanoparticles 141 constituting the upper coating 140 may be measured by photographing with a scanning electron microscope (SEM). FIG. 3 is an image taken with the scanning electron microscope and photographing a part of the upper coating 140 at 300,000 times.

In addition, the size and height of each of the plurality of nanoparticles 141 of the upper coating 140 may be measured by an atomic force microscope (AFM) analysis. FIG. 4 is an image illustrating the result of the atomic force microscope analysis. The image of FIG. 4 illustrates an image obtained on a two micrometer scale in the micrometer magnification analysis of the atomic force microscope.

Further, the upper coating 140 is formed to have a contact angle θ of about 30° to 50° with respect to water in order to prevent water droplets from being formed on and falling down from the surface of the component 100 used in the air conditioner. Here, when the water droplet 150 is attached to the surface of the upper coating 140 as illustrated in FIG. 5, the contact angle θ refers to an angle formed by a tangent line L of the water droplet 150 with the surface of the upper coating 140 at the portion of the water droplet 150 that is in contact with the surface of the upper coating 140.

Accordingly, the upper coating composition forming the upper coating 140 according to an embodiment of the present disclosure is formed to satisfy at least one or all of the above-described conditions.

In the nano-coating 120 as described above, the lower coating 130 and the upper coating 140 may be formed by spraying the lower coating composition and the upper coating composition using a spray gun.

Figure 6:
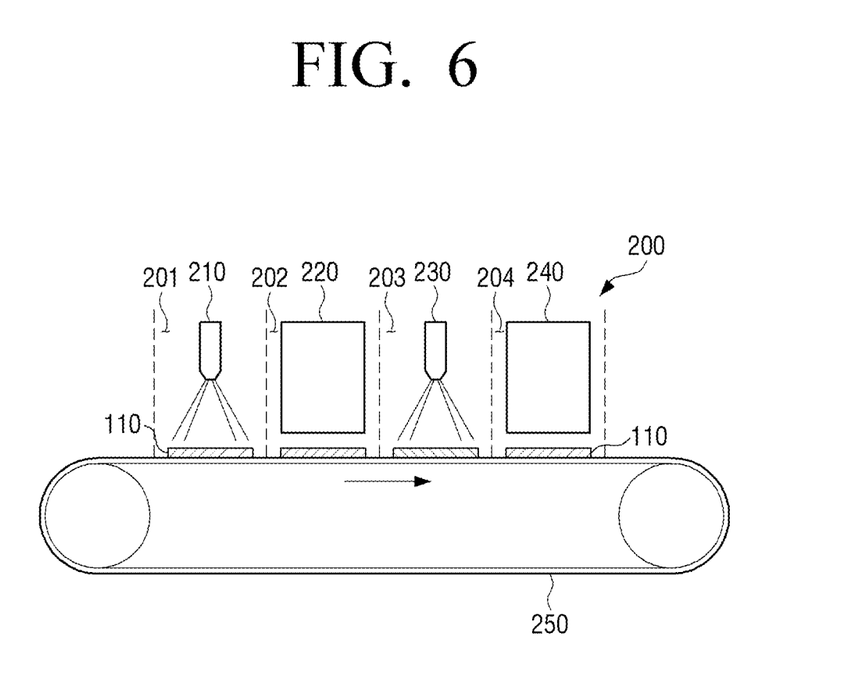
FIG. 6 is view schematically illustrating a nano-coating apparatus for forming a nano-coating on a component used in an air conditioner according to an embodiment of the present disclosure.

FIG. 6 illustrates an example of a nano-coating apparatus 200 that sprays a lower coating composition and an upper coating composition to form a lower coating and an upper coating.

Referring to FIG. 6, a nano-coating apparatus 200 according to an embodiment of the present disclosure may include a component carrier 250, a lower coating gun 210, an upper coating gun 230, a lower dryer 220, and an upper dryer 240.

The nano-coating apparatus 200 may include a lower coating region 201, a lower coating drying region 202, an upper coating region 203, and an upper coating drying region 204.

The component carrier 250 is formed to sequentially carry a component 110 used in the air conditioner to be coated to the lower coating region 201, the lower coating drying region 202, the upper coating region 203, and the upper coating drying region 204. In the case of the present embodiment as illustrated in FIG. 6, the component carrier 250 is implemented as a conveyer belt.

The lower coating gun 210 is disposed in the lower coating region 201, and the lower coating gun 210 sprays the lower coating composition to form the lower coating 130 on the component 110 for the air conditioner. Since the lower coating composition according to the present embodiment has a specific gravity of about 0.9 to 1.1, it is easy to form the lower coating 130 by spraying. The spray pattern of the lower coating gun 210 may be formed to be as wide as 45 degrees or more.

Since the lower coating composition contains a solvent, the condition of the coating operation may be variously determined according to the condition of the operator, the surrounding environment, the surface temperature of the component to be coated, and the like. As one example of the condition of the coating operation for the lower coating 130, the spraying pressure of the lower coating gun 210 may be about 2 to 4 bar (2.04~4.07 kg/cm$^2$), the distance between the lower coating gun 210 and the component 110 may be about 15 to 25 cm, and the operation temperature may be 30° C. or less.

The lower dryer 220 is disposed in the lower coating drying region 202, and the lower dryer 220 dries the lower coating 130 formed on the component 110 used in the air conditioner in the lower coating region 201. A heater may be used as the lower dryer 220. The condition in which the lower dryer 220 dries the component 110 used in the air conditioner may be variously determined depending on the composition of the lower coating composition. As an example, the drying condition of the lower coating may be set to dry the lower coating 130 at about 70° C. for at least 60 seconds.

The upper coating gun 230 is disposed in the upper coating region 203, and the upper coating gun 230 forms the upper coating 140 by spraying the upper coating composition onto the lower coating 130 of the component 110 used in the air conditioner that is dried through the lower coating drying region 202. Since the upper coating composition according to the present embodiment has a specific gravity of about 0.9 to 1.1, it is easy to form the upper coating 140 by spraying of the upper coating gun 230.

The condition for forming the upper coating 140 by using the upper coating gun 230 may be similar to the condition for forming the lower coating 130 by using the lower coating gun 210 described above, and thus a detailed description thereof is omitted.

The upper dryer 240 is disposed in the upper coating drying region 204, and the upper dryer 240 dries the upper coating 140 formed on the component 110 used in the air conditioner in the upper coating region 203. The condition in which the upper dryer 240 dries the component 110 used in the air conditioner may be variously determined depending on the composition of the upper coating composition. As an example, the drying condition of the upper coating may be set to dry the upper coating 140 at about 70° C. for at least 60 seconds.

As described above, when the component 110 used in the air conditioner passes through the lower coating region 201, the lower coating drying region 202, the upper coating region 203, and the upper coating drying region 204 of the nano-coating apparatus 200, the nano-coating 120 including the lower coating 130 and the upper coating 140 may be formed on the surface of the component 110 used in the air conditioner. Accordingly, the component 110 used in the air conditioner having the nano-coating 120 may have a function of preventing dust adhesion.

Hereinafter, in order to check the effect of the dust adhesion prevention function of the nano-coating as described above, a state in which the component 100 used in the air conditioner having the nano-coating 120 is contaminated by dust is examined. The dust contamination test results are illustrated in a table of FIG. 7.

Figure 7:
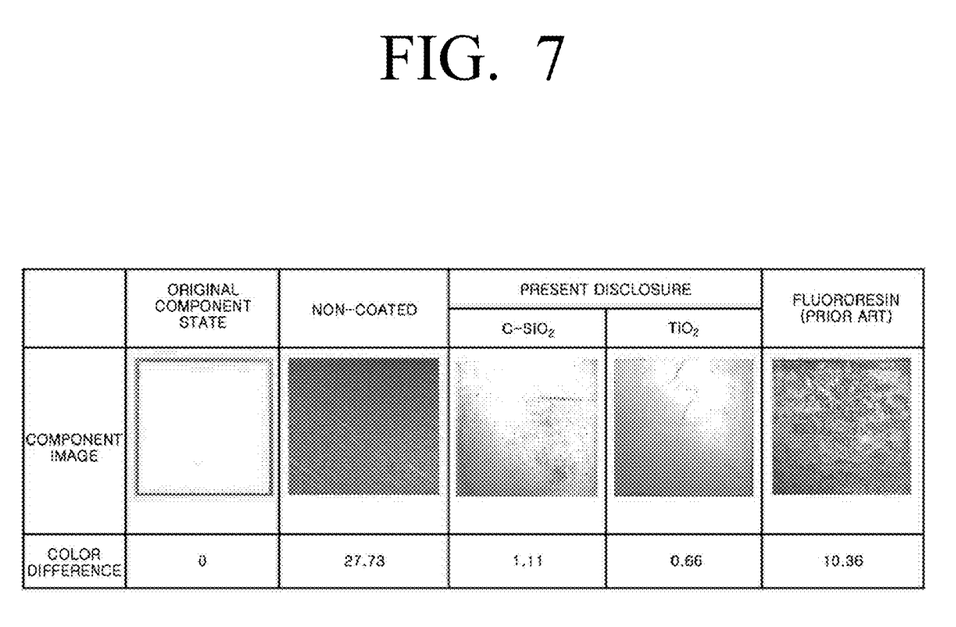
FIG. 7 is a table illustrating test results of a dust adhesion prevention function of the nano-coating applied to a component used in an air conditioner according to an embodiment of the present disclosure.

FIG. 7 is a table illustrating test results of a dust adhesion prevention function of a component used in an air conditioner having the nano-coating according to an embodiment of the present disclosure.

This dust contamination test uses particles of about 30 nm in diameter to check that the color of the surface of the component changes due to dust adhering to the surface of the component for ten years. In FIG. 7, the component image is a photograph showing the state of the test piece that has been tested.

In the table of FIG. 7, the original component state represents a state of a component before performing the surface treatment. In the case of the present embodiment, the original component state is white and the color difference is zero.

In the table of FIG. 7, the non-coated represents a state in which dust has adhered to a component that has not undergone any surface treatment for ten years. In this case, it can be seen that the surface of the component is changed to black due to adhesion of dust. At this time, the color difference of the non-coated test piece is 27.73. At this time, the color difference represents a value obtained by comparing the color of the original component and the color of the non-coated test piece. When the color difference is large, it indicates a state in which a lot of dust is attached, and when the color difference is small, it indicates that there is less dust adhered.

In the table of FIG. 7, C—SiO$_2$ and TiO$_2$ of the present disclosure refer to the case where C—SiO$_2$ powder and TiO$_2$ powder are used as nanoparticles used in the nano-coating, respectively. In this case, after the completion of the dust contamination test, the surface of the test piece shows almost no change. When the C—SiO$_2$ powder is used as the nanoparticles of the nano-coating, the color difference is 1.11, and when the TiO$_2$ powder is used, the color difference is 0.66. Therefore, there is little change in the color of component used in the air conditioner due to dust contamination. From this result, it can be seen that the use of TiO$_2$ powder as the nanoparticles is slightly more effective in preventing dust adhesion than when using the C—SiO$_2$ powder as the nanoparticles.

In the table of FIG. 7, when a component used in an air conditioner is coated with a fluororesin corresponding to the prior art having the dust adhesion prevention function, it can be seen that a lot of dust adheres to the surface of the component although it is smaller than that of the non-coated. Since the color difference of the component is 10.36 when the fluororesin coating is performed, the effect of preventing dust adhesion is lower than that of the component used in the air conditioner using the nanoparticles according to the present disclosure.

The present disclosure has been described above by way of example. The terms used herein are for the purpose of description and should not be construed as limiting. Various modifications and variations of the present disclosure are possible in light of the above descriptions. Therefore, the present disclosure can be freely carried out within the scope of the claims unless otherwise specified.

The invention claimed is:

1. A component used in an air conditioner, the component comprising:
   a substrate and a nano-coating formed on a surface of the substrate, the nano-coating comprising:
a lower coating formed on the surface of the substrate; and
an upper coating formed on an upper surface of the lower coating,
wherein an upper coating composition of the upper coating comprises nanoparticles having a diameter of 10 nm to 30 nm,
wherein peak-to-peak distance between adjacent nanoparticles of the nanoparticles located in a surface of the upper coating is 10 nm to 30 nm,
wherein the upper coating composition of the upper coating has a surface resistance of $10^8 \Omega$ to $10^{12} \Omega$, and
wherein the upper coating composition of the upper coating comprises at least one of $SnO_2$, $WO_3$, and organic-silane.

2. The component used in the air conditioner of claim 1, wherein the upper coating composition of the upper coating has a contact angle with respect to water of 30 degrees to 50 degrees.

3. The component used in the air conditioner of claim 1, wherein the upper coating composition of the upper coating does not comprise a fluorine (F).

4. The component used in the air conditioner of claim 1, wherein the upper coating composition of the upper coating has a specific gravity of 0.9 to 1.1.

5. The component used in the air conditioner of claim 1, wherein a lower coating composition of the lower coating comprises at least one of Ti, Si, and C.

6. The component used in the air conditioner of claim 5, wherein the lower coating composition of the lower coating has a specific gravity of 0.9 to 1.1.

7. The component used in the air conditioner of claim 1, wherein a thickness of the upper coating is different from a thickness of the lower coating.

8. The component used in the air conditioner of claim 7, wherein the thickness of the upper coating is in a range of 100 nm to 800 nm.

9. The component used in the air conditioner of claim 7, wherein the thickness of the lower coating is in a range of 20 nm to 300 nm.

10. The component used in the air conditioner of claim 1, wherein the component used in the air conditioner comprises at least one of a suction grille, a discharge port, a case, blades of a fan, and a heat exchanger.

* * * * *